(12) United States Patent
Kaiser et al.

(10) Patent No.: US 9,928,979 B2
(45) Date of Patent: Mar. 27, 2018

(54) METHOD FOR ACTIVATING A CONTROL DEVICE

(71) Applicant: Robert Bosch GmbH, Stuttgart (DE)

(72) Inventors: Martin Kaiser, Stuttgart (DE); Carsten Hermann, Reutlingen (DE); Ralph Bauer, Esslingen (DE); Johannes Kunst, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 270 days.

(21) Appl. No.: 14/827,082

(22) Filed: Aug. 14, 2015

(65) Prior Publication Data

US 2016/0056002 A1    Feb. 25, 2016

(30) Foreign Application Priority Data

Aug. 25, 2014  (DE) .................. 10 2014 216 809

(51) Int. Cl.
*H01H 47/00* (2006.01)
*H02H 3/18* (2006.01)
*H02H 9/04* (2006.01)

(52) U.S. Cl.
CPC ............ *H01H 47/002* (2013.01); *H02H 3/18* (2013.01); *H02H 9/049* (2013.01)

(58) Field of Classification Search
CPC .................................................. H01H 47/002
See application file for complete search history.

(56) References Cited

U.S. PATENT DOCUMENTS 9,160,159 B2 * 10/2015 Pantano ............... H02H 1/0092
2012/0120535 A1 * 5/2012 Bauer ................... H02H 9/049
361/91.5

FOREIGN PATENT DOCUMENTS

DE    10 2009 029 514    12/2010

* cited by examiner

*Primary Examiner* — Hai L Nguyen
(74) *Attorney, Agent, or Firm* — Norton Rose Fulbright US LLP; Gerard Messina

(57) ABSTRACT

A circuit arrangement for activating a control device includes: a first switch in a main current path, via which the control device is activated; an alternative current path; and a control logic which compares a voltage present for activating the control device to a threshold voltage and opens the first switch if the threshold voltage falls below so that a higher volume of an interference current effectuated by the present negative voltage flows via the alternative current path.

15 Claims, 3 Drawing Sheets

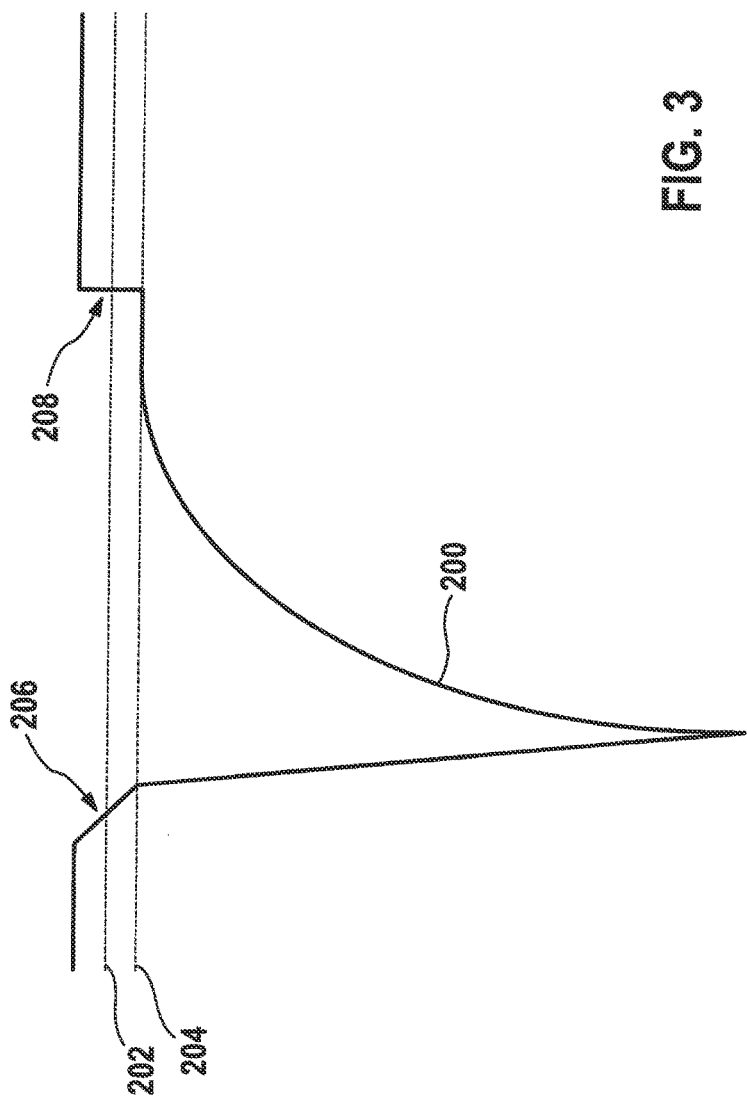

METHOD FOR ACTIVATING A CONTROL DEVICE

BACKGROUND OF THE INVENTION

1. Field of the Invention

The present invention relates to a method and to a circuit arrangement for activating a control device.

2. Description of the Related Art

Control devices are used, for example, in motor vehicles for controlling and regulating components and sequences. For the activation of control devices, circuit arrangements are used via which, for example, a supply voltage is provided. It must be noted that control devices must be protected against polarity reversal and overvoltage, for example, triggered by a load drop or load dump. Furthermore, a so-called main relay is provided for operating a control device which is to ensure a low quiescent current consumption.

It is necessary to protect electronic circuits against high negative current pulses, for example Pulse 1 from ISO 7637. This was previously achieved with high capacitances, for example, electrolytic capacitors in the on-board electrical system or inverse-polarity protection diodes. However, it must be taken into account that a high capacitance results in high costs. Moreover, a classic inverse-polarity protection diode causes a considerable voltage drop. This voltage drop of an inverse-polarity protection diode may be reduced by active inverse-polarity protection such as described in the German patent application publication DE 10 2009 029 514 A1.

The above-mentioned publication describes a circuit arrangement including a first field-effect transistor, a second field-effect transistor, a comparator, a suppressor diode and a trigger switch which serves to activate a control device. The comparator compares the voltage intended for activating the control device to a threshold voltage and, using a control unit, sets a clocked operation of the first field-effect transistor if the threshold voltage is exceeded. The described circuit arrangement fulfills the functions of an internal electronic main relay, a load dump protection, an inverse-polarity protection and a plug contact protection during plugging while energized.

The disadvantage of active inverse-polarity protection is, however, that this protection is no longer effective in the case of quick, negative pulses or that the used inverse-polarity protection field-effect transistor ruptures (Avalanche effect). This means that, for example, a protection with sufficient capacitances is necessary. A current may flow in the case of a negative pulse via the substrate of integrated semiconductor circuits, for example, ASICs, which are connected between ground and supply voltage. If this current is too high, it may result in malfunctions or even destruction.

BRIEF SUMMARY OF THE INVENTION

Using the presented method, electronic circuits or components, for example, ASICs, may be protected against negative voltage pulses. For this purpose, in one embodiment of a diode structure as may be present via the substrate of an ASIC to its connecting pins, an additional diode structure is actively connected in series. In this way it is achieved that the major part of the current flows through an additional protection diode connected in parallel during the interference.

The presented method is based on the idea of "forcing," in the case of a negative voltage pulse, the thereby effectuated current onto a parallel path which represents an alternative current path and to thus reduce the current in the main current path to an acceptable level. In this way, the capacitance in the activated control device may be reduced or an inverse-polarity protection may be omitted.

For example, a diode may be provided in the alternative current path. For this purpose, for example, a suppressor diode, which is provided anyway, may be used. A suppressor diode is a component which serves to protect electronic circuits against voltage pulses. It becomes conductive when a voltage threshold is exceeded. The current of the impulse thus bypasses the component to be protected so that no damaging voltage may be built up. In the presented method, the suppressor diode is operated in the flow direction.

The interference current, which is effectuated by the present negative supply voltage, at least partially discharges via the alternative current path. By changing the main current path, by opening the switch, a greater volume of the interference current is thus conducted via the alternative current path. In one embodiment, the alternative current path is designed in such a way that the major part of the interference current discharges via same.

Further advantages and embodiments of the present invention are derived from the description and the accompanying drawings.

It shall be understood that the above-mentioned features and those still to be described hereafter are usable not only in the particular described combination, but also in other combinations or alone, without departing from the scope of the present invention.

BRIEF DESCRIPTION OF THE DRAWINGS

FIG. 3 shows a negative voltage pulse.

DETAILED DESCRIPTION OF THE INVENTION

Figure 1:
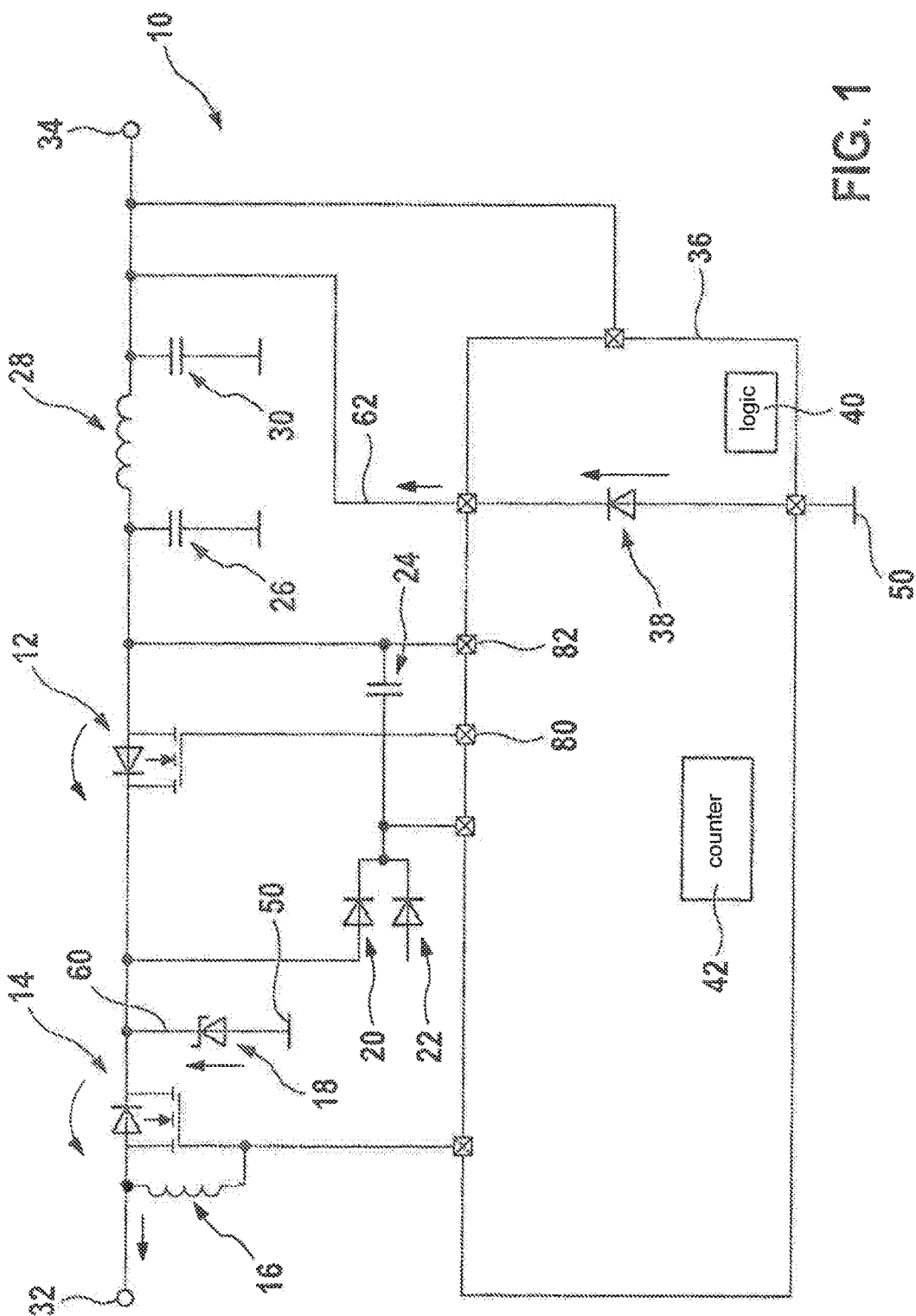
FIG. 1 shows one embodiment of the described circuit arrangement.

The present invention is shown schematically based on specific embodiments in the drawings and is described in greater detail hereafter with reference to the drawings.

FIG. 1 shows one embodiment of the presented circuit arrangement which as a whole is denoted by reference numeral 10. The diagram shows a first field-effect transistor 12, which represents a first switch, a second field-effect transistor 14 as a second switch, a first inductance 16, a suppressor diode 18, a first diode 20, a second diode 22, a first capacitance 24, a second capacitance 26, a second inductance 28, a third capacitance 30, a first terminal 32 for the supply voltage, a second connection 34 for connecting a control device and an application-specific integrated circuit (ASIC) 36, in which a substrate diode 38 is situated as a parasitic element and a logic 40 and a downtime counter 42 are provided.

Using suppressor diode 18, the voltage at the drain terminal of first field-effect transistor 12 may be limited to an intermediate voltage in order to reduce the power loss in first field-effect transistor 12. The suppressor diode is thus integrated for overvoltage protection. During negative pulses it is conductive in the flow direction. The structures of ASIC 36, which is connected between ground 50 and supply voltage, may also form a diode structure connected in the flow direction, in this case substrate diode 38 which may have a lower forward voltage than suppressor diode 18.

The two field-effect transistors 12 and 14 are turned on, i.e., low-ohmic, when the control device is turned on. First field-effect transistor 12 is integrated into circuit arrangement 10 in such a way that a body diode has the same flow direction as substrate diode 38 of ASIC 36. It is now provided that first field-effect transistor 12 is turned off in the case of a negative interference pulse so that it becomes high-ohmic. In this way, its body diode connected in series to substrate diode 38 becomes conductive.

However, both forward voltages together are higher than the forward voltage of suppressor diode 18. In this way, suppressor diode 18 takes on the major part of the interference current and the current via the substrate diode structure is reduced to a manageable level. In order to turn off first transistor 12 in a targeted manner, logic 40 or the circuit is in this embodiment implemented in ASIC 36 which turns off first field-effect transistor 12 below a threshold voltage and turns it back on at recovery of the voltage after the interference. Second field-effect transistor 14 remains activated the entire time in order to prevent an avalanche rupture. Entire logic 40 may be constructed discretely or, as shown in FIG. 1, implemented in ASIC 36.

The alternative current path, via which the major part of the interference current flows, is denoted by reference numeral 60. It includes suppressor diode 18 which may alternatively be designed as a rectifier diode. The main current path is denoted by reference numeral 62.

Logic 40 includes, for example, a comparator, in order to detect a falling below of the threshold voltage, and appropriate means for switching first field-effect transistor 12 or the first switch.

Reference numeral 80 denotes a terminal for activating first field-effect transistor 12. Reference numeral 82 represents a measuring pin for measuring the voltage. This voltage is compared to a threshold voltage. If it falls below, first field-effect transistor 12 is opened and a greater volume of the interference current caused by a voltage turning negative is conducted via alternative current path 60. The current via main current path 62 correspondingly decreases.

Figure 2:
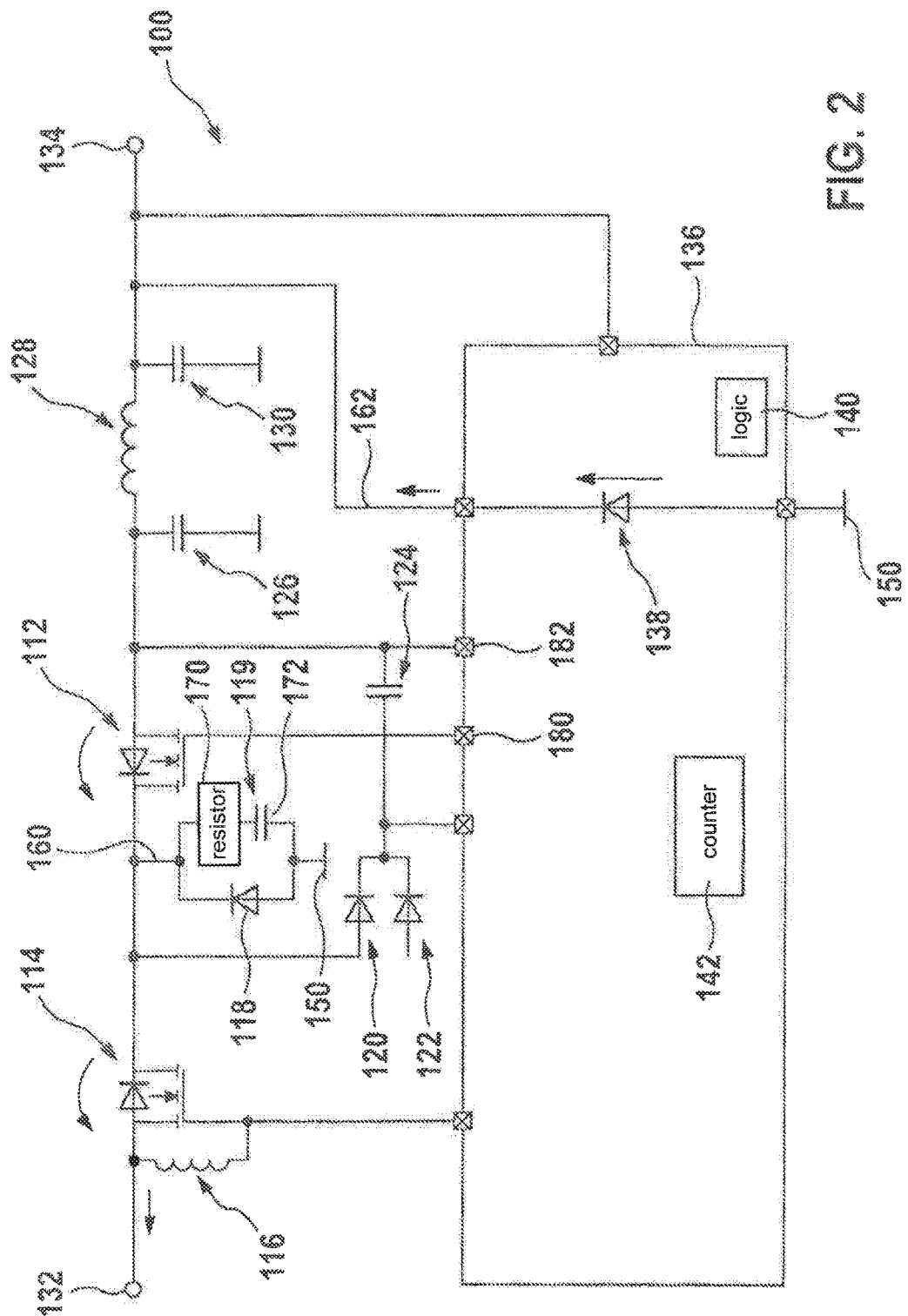
FIG. 2 shows one additional embodiment of the described circuit arrangement.

FIG. 2 shows an additional embodiment of the circuit arrangement which is denoted by reference numeral 100. The diagram shows a first field-effect transistor 112, which represents a first switch, a second field-effect transistor 114 as a second switch, a first inductance 116, a first diode 120, a second diode 122, a first capacitance 124, a second capacitance 126, a second inductance 128, a third capacitance 130, a first terminal 132 for the supply voltage, a second terminal 134 for connecting a control device and an application-specific integrated circuit (ASIC) 136, in which a substrate diode 138 is situated as a parasitic element and a logic 140 and a downtime counter 142 are provided. Ground is denoted by reference numeral 150.

Compared to the embodiment of FIG. 1, circuit arrangement 100 differs in that instead of suppressor diode 18 (FIG. 1), a parallel circuit of a diode 118 and an RC element 119 are provided. RC element 119 includes a resistor 170 and a capacitance 172. This parallel circuit is situated in this embodiment in alternative current path 160. The main current path is denoted by reference numeral 162.

Instead of the parallel circuit of diode 118 and RC element 119, it is also possible that a parallel circuit of a diode and a varistor is provided.

Reference numeral 180 denotes a terminal for activating first field-effect transistor 112. Reference numeral 182 represents a measuring pin for measuring the voltage. This voltage is compared to a threshold voltage. If it falls below, first field-effect transistor 112 is opened and a greater volume of the interference current caused by a voltage turning negative is conducted via alternative current path 160. The current via main current path 162 correspondingly decreases.

FIG. 3 shows a negative voltage pulse 200. The diagram furthermore shows the level of a threshold voltage 202 and the level of 0 V 204. If threshold voltage 202 is reached, the switch is opened at a first point in time 206. If the threshold voltage is exceeded again, the switch is closed at a second point in time 208.

The level of threshold voltage 202 is selected in such a way, usually at a positive level, in this case at approximately 1 V to 2 V, that the switch, in FIGS. 1 and 2 first field-effect transistors 12 and 112, are opened in time. The actual effect that the inference current is increasingly conducted via the alternative current path occurs only in the event of negative voltages.

In the presented method it is thus provided that the voltage is compared to a threshold voltage and that the switch is opened in order to at least partially "force" an interference current caused by voltages turning negative via the alternative current path.

What is claimed is:

1. A circuit arrangement for activating a control device, comprising:
   a first switch in a main current path that is closable to supply a voltage to activate the control device;
   an alternative current path; and
   a control logic, wherein the control logic is configured to open the first switch in response to the voltage falling below a predefined threshold so that a higher volume of an interference current effectuated by a present negative voltage flows via the alternative current path.

2. The circuit arrangement as recited in claim 1, further comprising a second switch arranged between the first switch and a source of the voltage, wherein the alternative current path is connected to a point between the first and second switches.

3. The circuit arrangement as recited in claim 2, wherein a second field-effect transistor serves as the second switch.

4. The circuit arrangement as recited in claim 3, wherein a first field-effect transistor serves as the first switch.

5. The circuit arrangement as recited in claim 3, wherein a suppressor diode is provided in the alternative current path.

6. The circuit arrangement as recited in claim 3, wherein the control logic is included in an application-specific integrated circuit (ASIC) to which the first switch is external.

7. A circuit arrangement for activating a control device, the circuit arrangement comprising:
   a first switch in a main current path and via which the control device is activatable;
   an alternative current path;
   a control logic, wherein the control logic is configured to open the first switch in response to a voltage present for the activation of the control device falling below a predefined threshold so that a higher volume of an interference current effectuated by a present negative voltage flows via the alternative current path; and
   a diode in an application-specific integrated circuit (ASIC), wherein the first switch is external to the ASIC and is connected between a source of the voltage and the diode.

8. The circuit arrangement as recited in claim 7, wherein the first switch and the diode are connected in series between ground and the source of the voltage.

9. The circuit arrangement as recited in claim 7, wherein the first switch includes a diode and a flow direction of the diode of the first switch and the diode of the ASIC is the same.

10. The circuit arrangement as recited in claim 9, wherein the first switch and the diode are connected in series between ground and the source of the voltage.

11. A method of a circuit for controlling activation of a control device, wherein the circuit includes a first switch in a main current path, an alternative current path, and a control logic, the method comprising:
   closing the first switch to supply voltage to activate the control device; and
   opening the first switch in response to the voltage falling below a predefined threshold so that a higher volume of an interference current effectuated by a present negative voltage flows via the alternative current path.

12. The method as recited in claim 11, wherein a major part of the interference current flows via the alternative current path.

13. A circuit arrangement for activating a control device, the circuit arrangement comprising:
   a first switch in a main current path and via which the control device is activatable;
   an alternative current path that includes (a) an RC element or a varistor, and (b) a diode that is connected in parallel to the RC element or varistor; and
   a control logic, wherein the control logic is configured to open the first switch in response to a voltage present for the activation of the control device falling below a predefined threshold so that a higher volume of an interference current effectuated by a present negative voltage flows via the alternative current path.

14. The circuit arrangement as recited in claim 13, wherein the alternative circuit path includes the RC element.

15. The circuit arrangement as recited in claim 13, wherein the alternative circuit path includes the varistor.

* * * * *